(12) United States Patent
Sasaki (10) Patent No.: US 6,909,456 B1
(45) Date of Patent: Jun. 21, 2005

(54) ELECTRONIC STILL CAMERA WITH PRINTER

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 775 days.

(21) Appl. No.: 09/614,652

(22) Filed: Jul. 12, 2000

(30) Foreign Application Priority Data

Jul. 14, 1999 (JP) .......................................... 11-201039

(51) Int. Cl.[7] ............................................. H04N 5/225
(52) U.S. Cl. .................... 348/207.2; 348/552; 348/372; 348/373; 348/375; 358/909.1; 358/906; 347/2; 396/535; 396/541
(58) Field of Search ............................. 348/207.2, 552, 348/372, 373, 374, 375, 376; 347/2; 358/909.1, 906; 396/301, 535, 536, 538, 539, 541

(56) References Cited

U.S. PATENT DOCUMENTS

| | | | | |
|---|---|---|---|---|
| 4,262,301 A | * | 4/1981 | Erlichman | 386/31 |
| 4,420,773 A | * | 12/1983 | Toyoda et al. | 386/118 |
| 4,827,347 A | * | 5/1989 | Bell | 348/333.05 |
| 4,937,676 A | * | 6/1990 | Finelli et al. | 348/375 |
| 5,231,511 A | * | 7/1993 | Kodama et al. | 386/118 |
| 5,606,420 A | * | 2/1997 | Maeda et al. | 358/296 |
| 5,635,983 A | * | 6/1997 | Ohmori | 348/231.6 |
| 5,715,234 A | * | 2/1998 | Stephenson et al. | 396/429 |
| 5,757,388 A | * | 5/1998 | Stephenson | 347/2 |
| 5,802,413 A | * | 9/1998 | Stephenson | 396/429 |
| 5,822,637 A | * | 10/1998 | Stephenson | 396/429 |
| 5,917,545 A | * | 6/1999 | Kowno et al. | 348/231.9 |
| 5,917,548 A | * | 6/1999 | McIntyre | 348/333.06 |
| 5,949,469 A | * | 9/1999 | Stephenson | 347/255 |
| 5,970,215 A | * | 10/1999 | Stephenson | 358/1.9 |
| 5,978,609 A | * | 11/1999 | Aoki | 396/429 |
| 5,980,010 A | * | 11/1999 | Stephenson | 347/2 |
| 6,040,849 A | * | 3/2000 | McIntyre et al. | 347/214 |
| 6,091,909 A | * | 7/2000 | McIntyre et al. | 396/278 |
| 6,102,505 A | * | 8/2000 | McIntyre et al. | 347/2 |
| 6,167,208 A | * | 12/2000 | Sato | 396/532 |
| 6,241,351 B1 | * | 6/2001 | Stephenson | 347/109 |
| 6,411,361 B1 | * | 6/2002 | Hidaka et al. | 355/40 |
| 6,421,082 B1 | * | 7/2002 | McIntyre et al. | 348/207.99 |
| 6,618,078 B1 | * | 9/2003 | Budrys | 348/207.99 |
| 6,628,333 B1 | * | 9/2003 | Gowda et al. | 348/333.11 |

FOREIGN PATENT DOCUMENTS

WO        WO99/21055        4/1999

OTHER PUBLICATIONS

Abstract WO99/21055 Apr. 29, 1999.

* cited by examiner

Primary Examiner—Andrew Christensen
Assistant Examiner—Brian Genco
(74) Attorney, Agent, or Firm—Sughrue Mion, PLLC (57) ABSTRACT

There is disclosed an electronic still camera that has a printer section in addition to a camera section. The printer section prints an image on a self-developing type instant photo film unit in accordance with digital image data picked up and memorized through the camera section. A film pack containing a stack of instant photo film units is loaded in a loading chamber of the electronic still camera, such that the instant photo film units of the film pack are successively exposed through the printer section. A connector device for connecting a battery pack to the electronic still camera is provided in the loading chamber, whereas a charging circuit for charging a main power source with the battery pack is provided in the electronic still camera.

16 Claims, 7 Drawing Sheets

ELECTRONIC STILL CAMERA WITH PRINTER

BACKGROUND OF THE INVENTION

1. Field of the Invention

The present invention relates an electronic still camera with a printer incorporated thereinto, and more particularly to an electronic still camera having a loading chamber for holding recording materials for the printer.

2. Background Arts

Portable electronic still cameras are widely used, which convert an optical image of a subject to an electric image signal through a CCD image sensor or the like, and convert the image signal to digital image data. The image data may be written in a memory for each frame, and may be read out from the memory. The electronic still camera is provided with a display panel, mostly an LCD panel, that functions either as an electronic viewfinder for displaying moving images of the subject in a real time fashion or as a monitor for displaying still images of the frames written in the memory. Based on the digital image written in the memory, the images photographed by the electronic still camera may be displayed on an external display device, such as a home TV or a personal computer, or hard copies of the photographed images may be printed through an external printing device.

In order to make it possible to get hard copies of the images photographed by the electronic still camera without any external device, an electronic still camera with a printing function has been suggested, for example, in WO99/21055. In this type of electronic still camera, an image is printed onto a self-developing type photo film unit, called an instant film unit. Therefore, the electronic still camera of this type has an optical printer section and a film pack chamber for holding an instant film pack that contains a plurality of instant photo film units in a stack, in addition to those elements which are necessary for the camera function.

In view of portability and handiness, the electronic still camera with printer should be able to use batteries as its power source, like other cameras. Since the printer section and the film pack chamber take a relatively large space in the electronic still camera, the electronic still camera with printer would have an enlarged size in order to load a power source of a sufficiently large capacity as compared to conventional electronic still cameras with no printer. Largeness would damage handiness of the electronic still camera. So it is difficult to allocate a sufficient space for the power source batteries in the electronic still camera with printer. But a small capacity power source will run down soon, because the electronic still camera consumes a remarkably large amount of electric power for driving the CCD image sensor and the LCD panel, in comparison with conventional analog cameras that directly photograph pictures on photographic film.

SUMMARY OF THE INVENTION

In view of the foregoing, an object of the present invention is to provide an electronic still camera with printer that is able to extend a particular function without the need for enlarging the total size of the camera.

Another object of the present invention is to provide an electronic still camera that is compact and handy to carry about but can work continuously for a long time.

According to the invention, an electronic still camera comprising a camera section for picking up electronic images of subjects through an image sensor, and memorizing digital image data of the electronic images, and a printer section for recording images on recording materials on the basis of the digital image data, characterized by comprising:

a main power source for supplying the camera section and the printer section;

a loading chamber for holding the recording materials in a position for allowing the printing section to print on the recording materials; and a connection device provided in the loading chamber, for connecting the electronic still camera to an extending device that may be loaded in the loading chamber in place of the recording materials, for extending a particular function of the electronic still camera.

Since the extending device is loaded in the loading chamber that is usually used for holding the recording materials, it comes to be possible to extend a particular function of the electronic still camera while maintaining the size of the camera body unchanged.

By loading a supplementary power source as the extending device, the electronic still camera can work continuously for a long time.

It is preferable to constitute the main power source of at least a rechargeable battery, and provide the electronic still camera with a charging circuit for charging the main power source with the supplementary power source.

It is more preferable to load the supplementary power source as a package that contains a plurality of rechargeable batteries.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
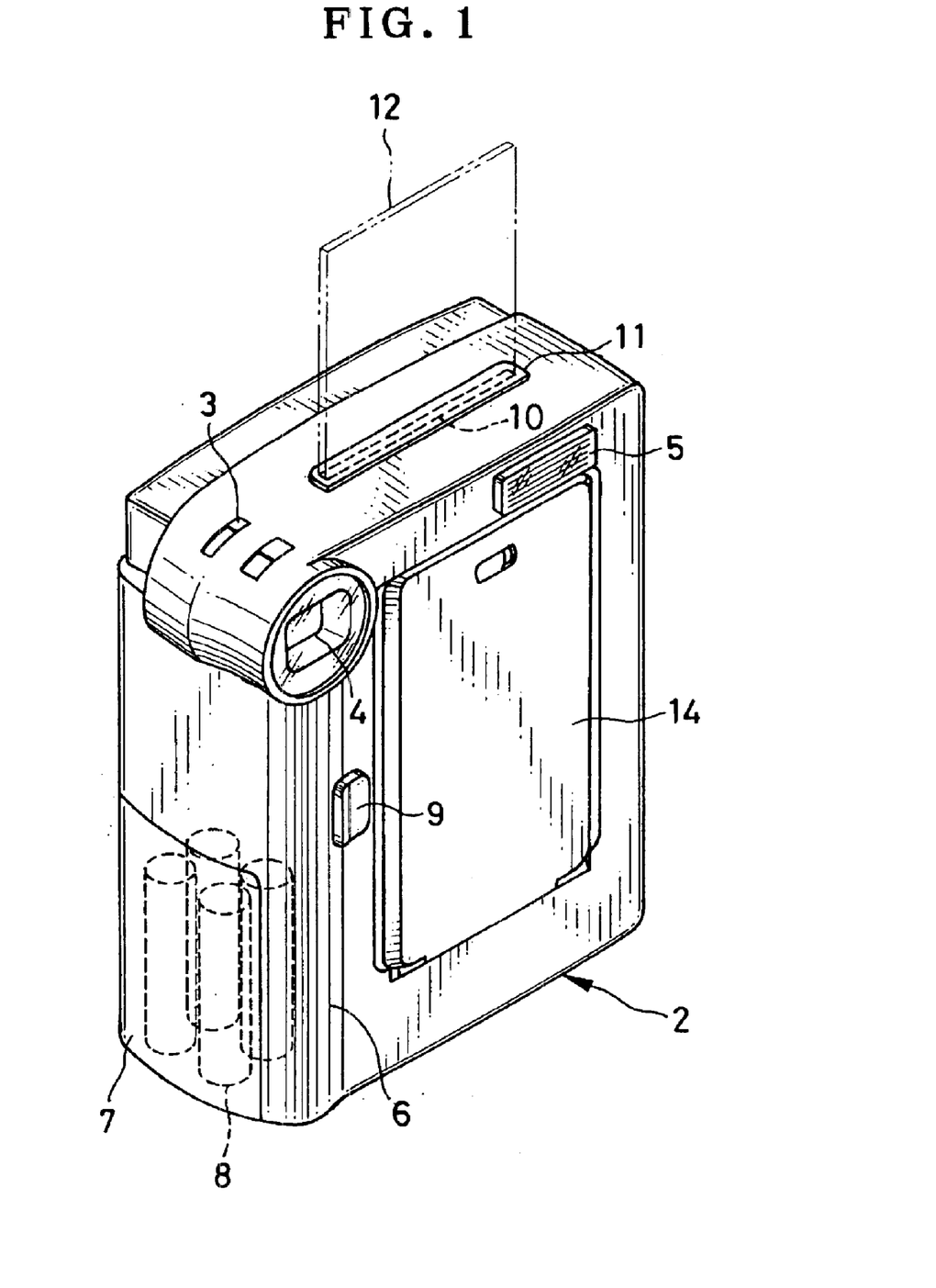
FIG. 1 is a front perspective view of an electronic still camera with an optical printer section according to an embodiment of the present invention.

In an electronic still camera 2 shown in FIG. 1, a power switch 3 is located at an upper portion of a camera body. When the power switch 3 is turned on, various operation keys get effective, and the camera automatically proceeds to an imaging mode for picking up image signals from subjects. A camera lens 4 and a flash window 5 are located at upper front portions. In this embodiment, the camera lens 4 is a pan-focus lens whose depth of field ranges from 1.2 m to infinity. A grip portion 6 is provided with a battery chamber lid 7 which may be opened for loading or changing batteries 8. These batteries 8 are used as a main power source for the electronic still camera 2. In this embodiment, four pieces of AA size rechargeable batteries are used for the main power source batteries 8. A picture taking button 9 is located at a front area of the grip portion 6.

Figure 2:
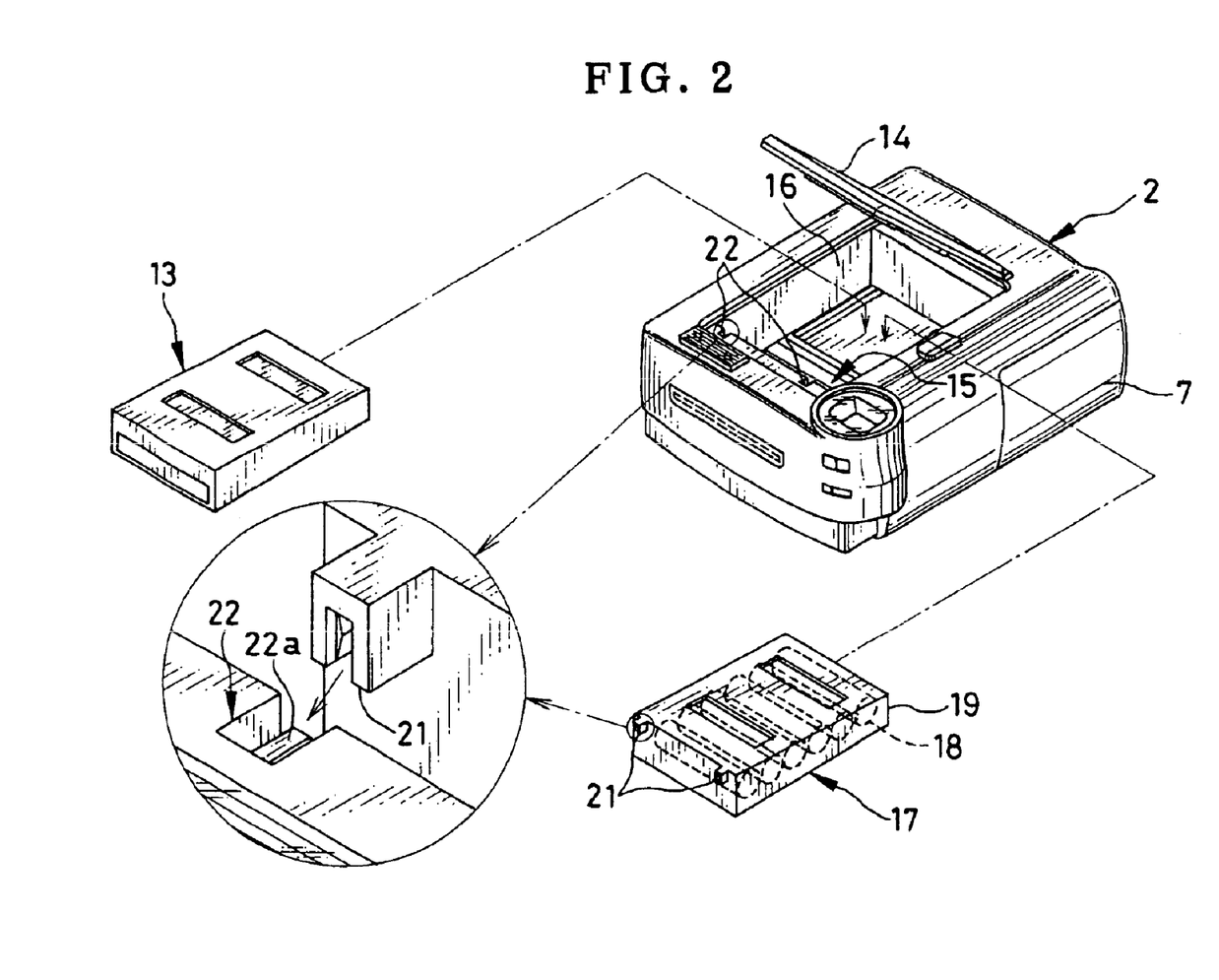
FIG. 2 is an explanatory diagram illustrating an essential feature of the present invention embodied in the electronic still camera of FIG. 1.

A film exit slot 10 is formed through a top face of the camera body, and is usually covered with a light-shielding door 11. As shown in FIG. 2, an instant film pack 13 containing a stack of instant film units 12 may be loaded in a loading chamber 16 by opening a front lid 14 of the camera body. A printer section 15 is disposed on a bottom area of the loading chamber 16. The film units 12 are successively exposed through the printer section 15, and ejected through the film exit slot 10 while pushing up the light-shielding door 11. The instant film unit 12 may be of a conventional self-developing type photo film unit with a pod 12a of processing fluid (see FIG. 4).

The loading chamber 16 may be alternatively used as a subsidiary battery chamber for holding a battery pack 17 in place of the film pack 13. The battery pack 17 contains six pieces of rechargeable batteries 18 in a case 19. The case 19 has a similar contour to the film pack 13, and is provided with a pair of terminal connectors 21 on one end thereof. Counterpart connectors 22 with electric contacts 22a are formed in one side wall of the loading chamber 16. Thus, the battery pack 17 is connected to an electric circuit of the electronic still camera 2 through connection between the connectors 21 and 22. The battery pack 17 is used as a supplementary power source that may supply the electronic still camera in place of the main power source 8, or may be used for charging the main power source batteries 8. It is possible to use non-rechargeable batteries as the main power source. In that case, the battery pack 17 is used as an alternative power source only.

Figure 3:
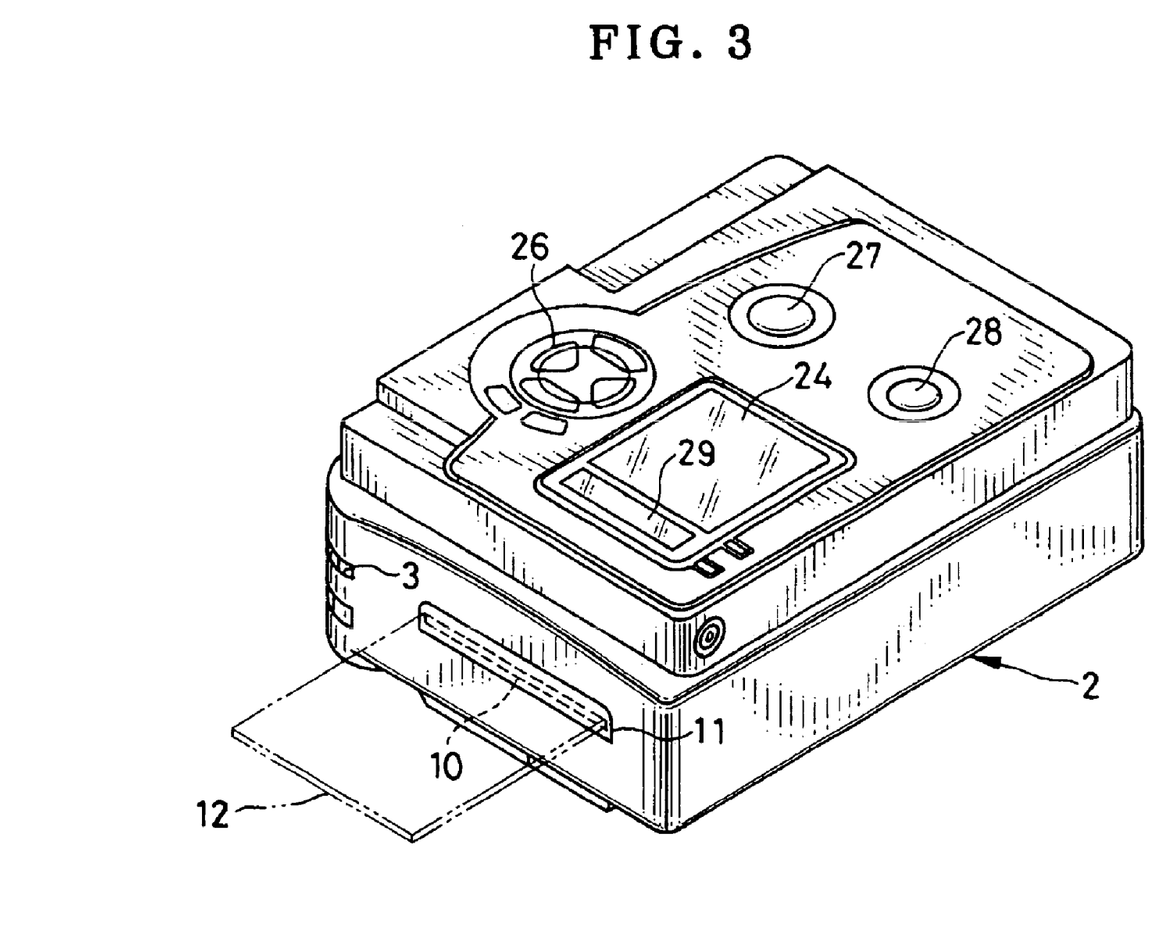
FIG. 3 is a rear perspective view of the electronic still camera of FIG. 1.

On a rear side of the electronic still camera 2 of this embodiment, there are provided an LCD panel 24, a multi-operation button 26, a mode shifting key 27, a print start key 28 and an information display panel 29 for displaying information on photography and printing. The LCD panel 25 constitutes an electronic viewfinder for displaying moving images of subjects in a photographic field of the camera lens 4 in a real time fashion, and also serves as a monitor for displaying still images based on digital image data written in a memory. The memory may be a build-in memory of the electronic still camera 2 or a memory medium that may be attached or connected to the electronic still camera 2, such as a memory card, CD-ROM, MD, DVD and the like.

Figure 4:
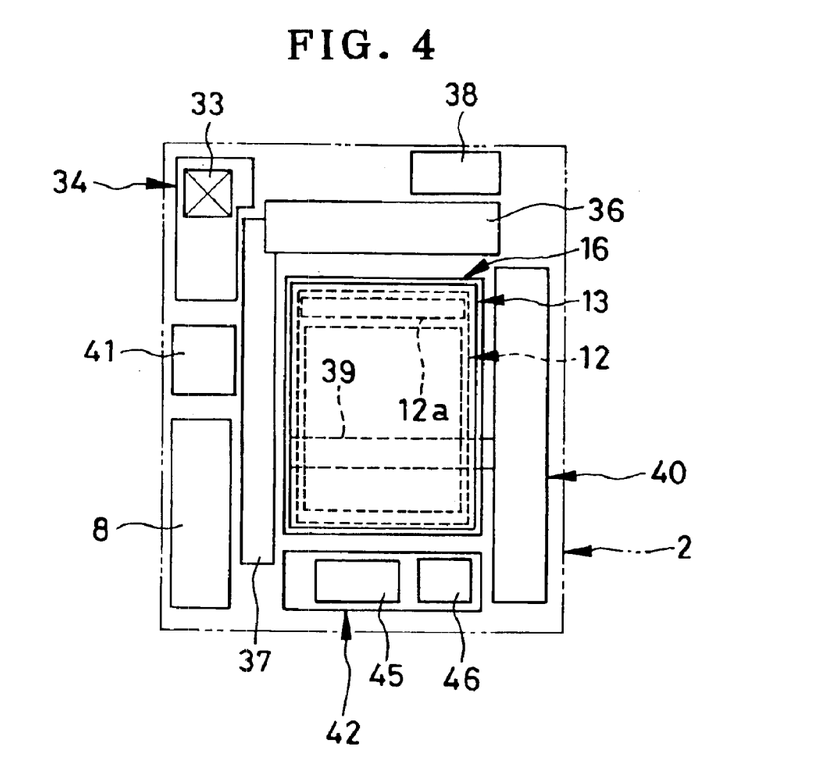
FIG. 4 is an explanatory diagram illustrating an internal construction of the electronic still camera, as viewed from the front.

Referring to FIG. 4 showing the interior of the electronic still camera 2, an imaging unit 34 including a CCD image sensor 33 is disposed behind the camera lens 4. A pair of developing rollers 36 are disposed between the loading chamber 16 and the film exit slot 10, for feeding the exposed instant film unit 12 from the film pack 13 to the film exit slot 10. A developing mechanism 37, a head scanning mechanism 40 for a linear optical printing head 39, and a control section 42 are also disposed around the loading chamber 16. Designated by 38 is a flash circuit board. The developing rollers 36 and the developing mechanism 37 are driven by a motor 41. The developing rollers 36 and the developing mechanism 37 may have the same construction as used in conventional instant cameras, such as disclosed in JPA 4-194832, and operate in the same way as conventional, so detailed description of these elements are omitted for brevity.

In the imaging mode, an optical image formed through the camera lens 4 on the CCD image sensor 33 is converted into digital image data, and is simultaneously displayed on the LCD panel 24. Upon the picture taking button 9 being pressed, a frame of digital image data of the subject image displayed on the LCD panel 24 at that moment is written as a still image in the memory. By operating the mode shift key 27, the electronic still camera 2 may be switched to a monitoring mode wherein the operator may display an appropriate one of the memorized still images on the LCD panel 24, or to a printing mode wherein an appropriate number of hard copies of an image selected on the LCD panel 24 may be made by operating the multi-operation button 26 and the print star key 27.

Figure 5:
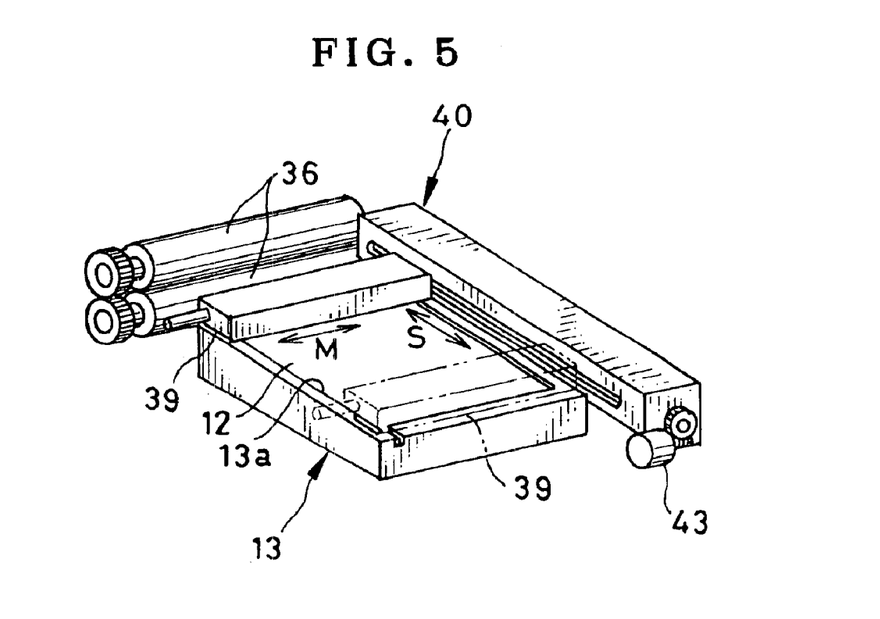
FIG. 5 is a perspective view of a printer section that is incorporated into the electronic still camera of FIG. 1.

As shown in FIG. 5, the head scanning mechanism 40 is driven by a scanning motor 43. The developing rollers 36, the developing mechanism 37, the printing head 39, the head driving mechanism 40, and the motors 41 and 43 constitute the printer section 15. The printing head 39 extends along a direction perpendicular to a film advancing direction toward the film exit slot 10, and is moved back and forth along the film advancing direction by the head scanning mechanism 40 when the scanning motor 43 is rotated back and forth. Hereinafter, the lengthwise direction of the printing head 39 will be called a main scan direction M, while the moving direction of the printing head 39 will be called a sub scan direction S.

The printing head 39 has an optical element array that can project red, green and blue light beams as a linear optical image along the main scan direction onto an exposure surface of the instant film unit 12 that is disposed behind an exposure opening 13a of the film pack 13. The optical element array may be constituted of LCD segments arranged in a row which are driven in combination with a fluorescent lamp and three color filters, or red, green and blue LEDs arranged in three rows. The printing head 39 projects light beams of one color, while being moved from one end to the other end of the exposure opening 13a in the sub scan direction S, so one color frame of a full-color image is photographically printed line after line on the exposure surface. The printing head 32 makes one and half reciprocation in the sub scan direction S to print the full-color image in a three color frame sequential fashion on each film unit 12. However, it is possible to construct or drive the printing head 39 such that three color frames are printed concurrently during one way movement of the printing head 39 in the sub scan direction S. It is also possible to use a stationary linear printing head, and expose the instant film unit 12 line after line while advancing the instant film unit 12 toward the film exit slot 10.

After the full-color image is printed as a latent image on the exposure surface of the instant film unit 12, the developing rollers 36 and the developing mechanism 37 are driven by the motor 41 to advance the exposed instant film unit 12 out of the film pack 13 toward the film exit slot 10.

The control section 42 includes an image processing circuit and other necessary components for controlling the overall operation of the electronic still camera 2 in accordance with input signals from the multi-operation button 26, the mode shift key 27 and the print key 28. The control section 42 also includes the built-in memory 45 and a charging circuit 46 that is used for charging the main power source batteries 8 with the battery pack 17.

The electronic still camera 2 having the above described construction operates as follows:

To use the camera function of the electronic still camera 2 continuously for a long time, the battery pack 17 is loaded in the loading chamber 16. Then the battery pack 17 is connected through the connectors 22 and 21 to the circuit of the electronic still camera 2.

When the power switch 3 is turned on, the electronic still camera 2 is initially set to the imaging mode. In the imaging mode, an optical image formed through the camera lens 4 on the CCD image sensor 33 is continuously converted into digital image data, and is simultaneously displayed on the LCD panel 24. Upon the picture taking button 9 being pressed, image data of a frame of image displayed on the LCD panel 24 at that moment is written as a still image frame in the memory 45. The memory 45 is capable of storing image data of 50 still image frames. After the maximum number of image frames are written in the memory 45, it is possible to delete unnecessary image frames from the memory 45 or transfer the image data to an external memory, while monitoring the memorized image frames on the LCD panel 24 in the monitoring mode by operating the mode shift key 27 and the multi-operation button 26. Thus, it is possible to take more than 50 frames repeatedly by the electronic still camera 2.

Since the battery pack 17 is connected as the supplementary power source in addition to the main power source batteries 8, the electronic still camera 2 may be supplied either from the main power source 8 or from the battery pack 17. Therefore, the electronic still camera 2 can work continuously for a long time, even though the LCD panel 24 and the CCD image sensor 33 consume a relatively large amount of electric power. While the electronic still camera 2 is not used, the electronic still camera 2 may be set to a charging mode by operating the mode shift key 27. Then, the charging circuit 46 is activated to charge the main power source batteries 8 with the battery pack 17. Thereby, the voltage of the main power source 8 is restored to a sufficient level enough for driving the printer section 15.

For printing, the battery pack 17 is replaced by the film pack 13, and the printing mode is selected by operating the mode shift key 27. After selecting an appropriate one of the memorized still images on the LCD panel 24, and designating the number of hard copies to make by operating the multi-operation button 26, the operator presses the print star key 27. Then the control section 24 drives the printing head 39 in accordance with image data read out from the memory 45, and also drives the head scanning mechanism 40 in synchronism with the printing head 39. For example, the printing head 39 moves from an initial position shown by phantom lines in FIG. 5 to a terminal position shown by solid lines, while projecting red light beams across the main scan direction M in accordance with red image data of the selected image. Thus, a red frame of the selected full-color image is printed line after line as a latent image on the exposure surface of the instant film unit 12. Thereafter, while moving from the terminal position to the initial position, the printing head 39 prints line after line a green frame of the selected image as a latent image on the exposure surface of the instant film unit 12 in accordance with green image data of the selected image. And then, while moving from the initial position to the terminal position, the printing head 39 prints line after line a blue frame of the selected image as a latent image on the exposure surface of the instant film unit 12 in accordance with blue image data of the selected image.

After printing the three color frames of the selected image sequentially on the exposure surface, the printing head 39 is moved further from the terminal position toward the developing rollers 36 into a retracted position. Then, the developing mechanism 37 is driven by the motor 41 to push the exposed instant film unit 12 at its trailing end by a claw member, thereby to advance the film unit 12 out of the film pack 13. The developing rollers 36 are also rotated to nip and draw the instant film unit 12 thereinto, and feed the instant film unit 12 out to the film exit slot 10. After the exposed instant film unit 12 is fed out of the film pack 13, the scanning motor 44 is driven to move the printing head 39 back to the initial position.

As the instant film unit 12 is squeezed through the developing rollers 36, the pod 12a is ruptured, and the processing liquid is spread on the instant film unit 12. Thus, the three color latent images are developed into a positive full-color image in a few minutes.

When all of the instant film units 12 contained in the film pack 13 have been exposed, the emptied film pack 13 may be replaced by a new film pack 13, to continue printing. It is preferable to load the battery pack 17 in the loading chamber 16 and recharge the main power source batteries 8 with the battery pack 17 prior to loading the new film pack 13. Thereby, a large number of instant film units may be exposed in succession at any places, e.g. outdoors, without the need for recharging the main power source batteries 8 through a separate charging device that is connected to the AC power supply network.

Although the battery pack 17 is loaded in the loading chamber 16 in place of the film pack 13 while the printer section 15 is not used in the above description, it is of course possible to drive the camera section including the CCD image sensor 33 for photography by the main power source 8 while the film, pack 13 is loaded in the loading chamber 16. In that case, the electronic still camera 2 may be appropriately switched over between the imaging mode, the monitoring mode and the printing mode, to printed out photographed images immediately after their image data is written in the memory 45.

Figure 6A:
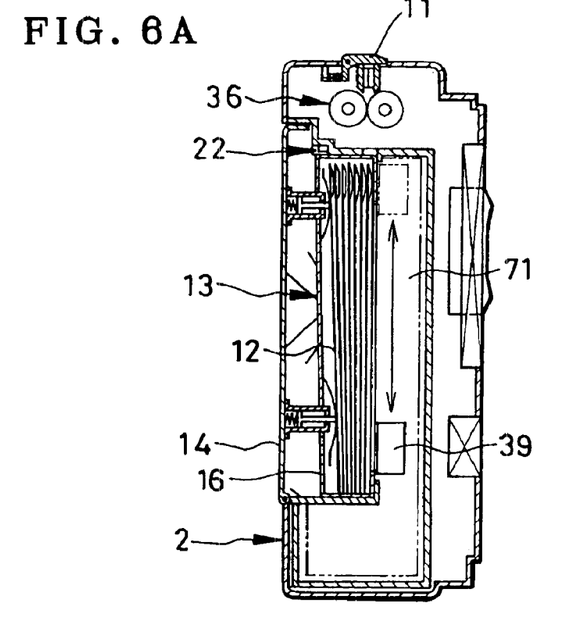
FIG. 6A is a vertical sectional view of the electronic still camera of FIG. 1, as loaded with a film pack.
Figure 6B:
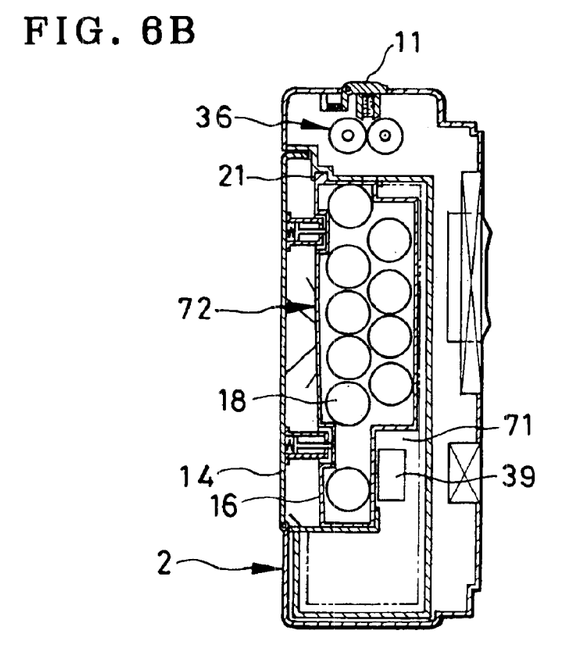
FIG. 6B is a similar view to FIG. 6A, but illustrating a condition where a large size battery pack is loaded in place of the film pack.

Meanwhile, since a room 71 for the reciprocation of the printing head 39 in the sub scan direction S is provided in connection to the loading chamber 16, as shown in FIG. 6A, and the printing head 39 stays in the initial position except when the printing process is carried out, as shown by solid line in FIG. 6A, most space in the room 71 remains open while the battery pack 17 of the same size as the film pack 13 is loaded in the loading chamber 16. Therefore, it is preferable to provide a battery pack 72 that is shaped to take up not only the loading chamber 16 but also the open space of the room 71, as shown in FIG. 6B. Because the large size battery pack 72 can contain a larger number of batteries, the capacity of the supplementary power source is enlarged, while the size of the camera body is maintained unchanged.

Although the above embodiment has been described on the assumption that the film pack 13 may not be unloaded unless all of the contained instant film units 12 are exposed and ejected from the electronic still camera 2, the present invention is applicable to those still cameras which can load another type of film pack that may be repeatedly unloaded and reloaded while it contains unexposed instant film units. In that case, if the main power source batteries 8 run down before all of the instant film units 12 in the film pack have been exposed, the main power source batteries 8 may be recharged with the battery pack 17 or 72 by unloading the film pack and loading the battery pack 17 or 72 instead. After the main power source batteries 8 are fully recharged, the half-used film pack may be loaded again in the loading chamber 16 to continue printing.

Figure 7:
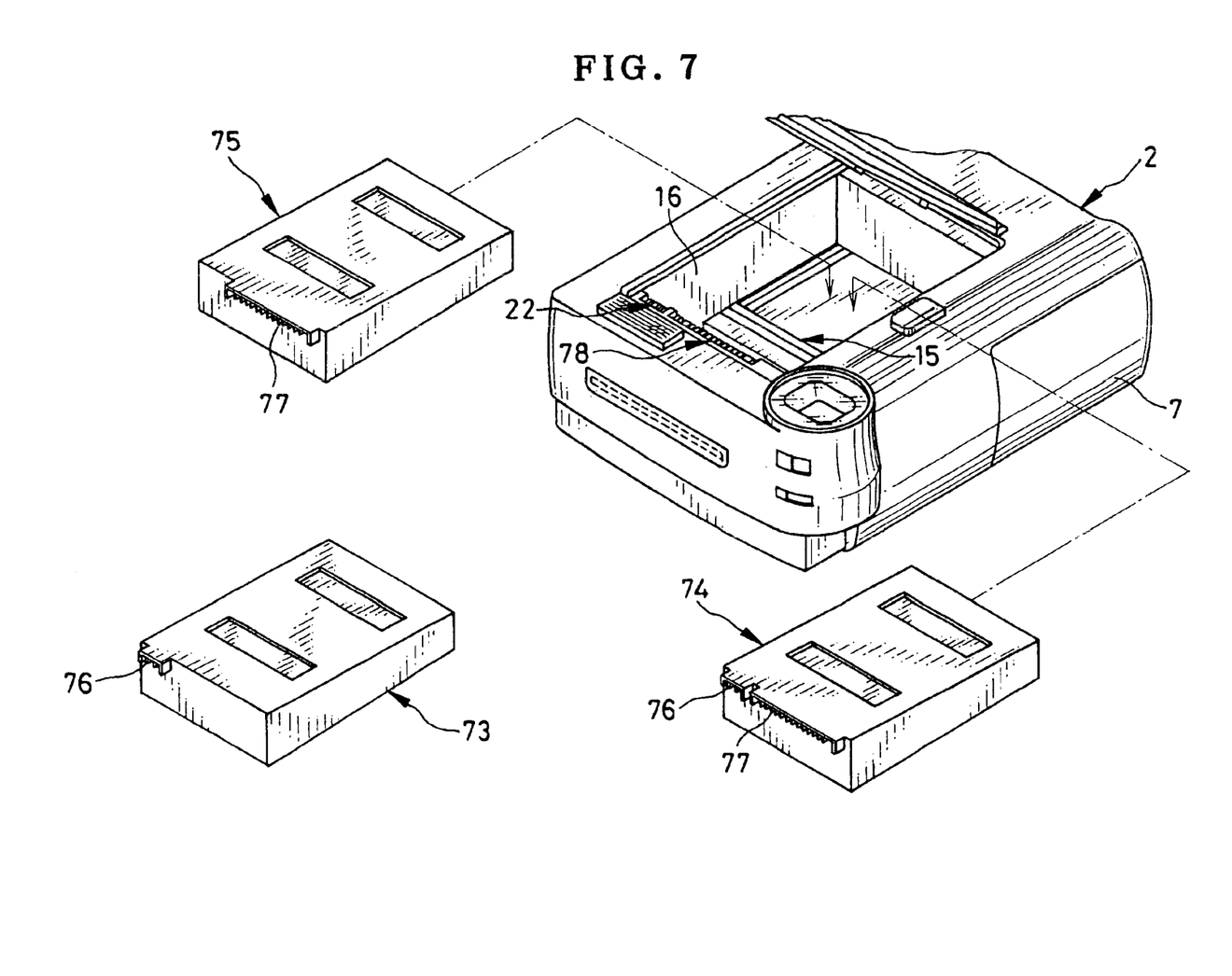
FIG. 7 is an explanatory diagram illustrating another embodiment of the present invention.

It is possible to make the loading chamber 16 capable of loading an AC/DC adapter 73, a hard disc assembly 74, a memory pack 75, or another kind of extending attachment, as shown in FIG. 7. In this embodiment, a connector 78 for data communication is provided beside a connector 22 for power supply in the loading chamber 16, whereas a power supply connector 76 is formed on each of the AC/DC adapter 73 and the hard disc assembly 74, and a data communication connector 77 is formed on each of the hard disc assembly 74 and the memory pack 75. It is also possible to provide a specific package containing a memory and supplementary batteries and having a contour that fits in the loading chamber 16. Thereby, both the memory capacity and the power source capacity may be increased while keeping balance with each other.

Although the printer section 15 of the electronic still camera of the above embodiments is of an optical type that prints an image photographically on an instant film unit, the present invention is applicable to an electronic still camera with another type of printer section, such as a thermosensitive type, a thermal transfer type, an ink-jet type, a laser scanning type and so forth.

Figure 8:
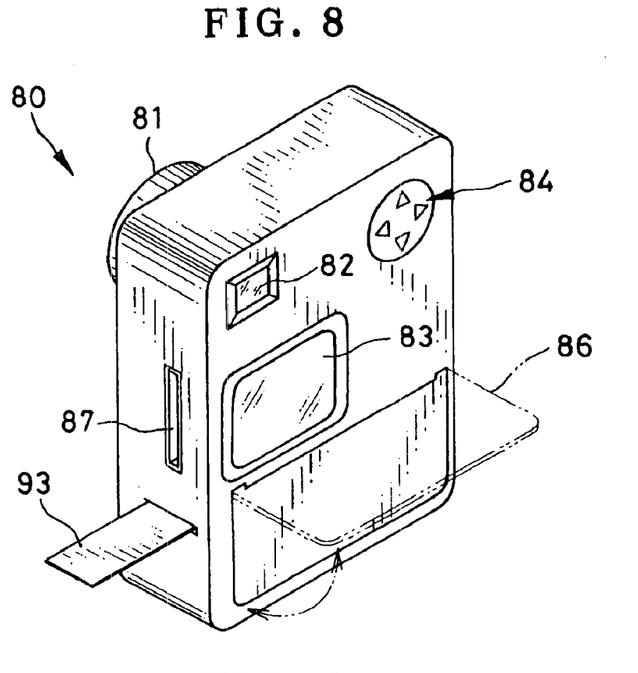
FIG. 8 is a perspective view of an electronic still camera with a thermal printer section, according to a further embodiment of the invention.
Figure 9:
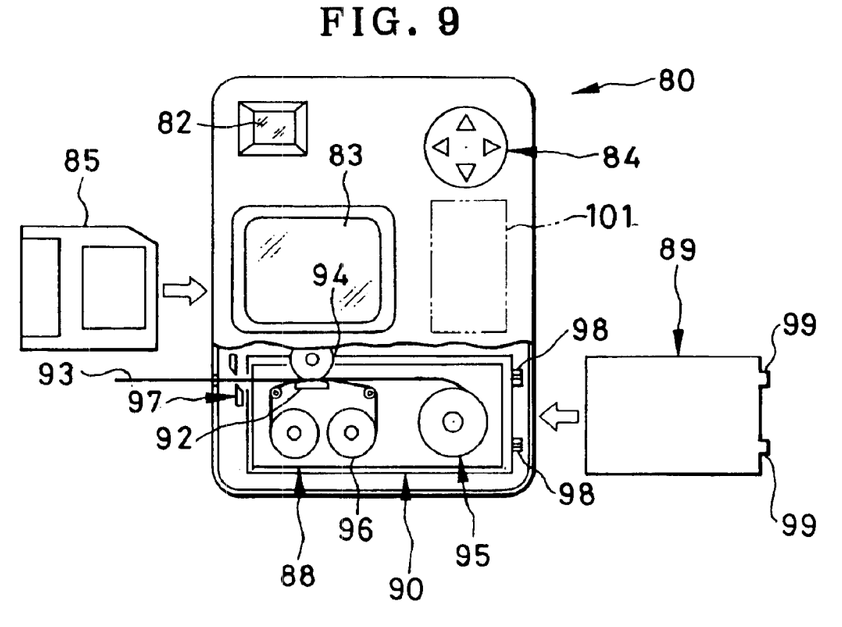
FIG. 9 is an explanatory diagram illustrating the essential features of the present invention embodied in the electronic still camera of FIG. 8.

According to an embodiment shown in FIGS. 8 and 9, an electronic still camera 80 is provided with a thermal transfer type printer section. A camera lens 81 is located on a front portion, and a not-shown CCD image sensor is disposed behind the camera lens 81. A viewfinder 82, an LCD panel 83, a mode shifting button 84, and a lid 86 are located on the back side of the camera 80. A slot 87 provided on one side of the camera 80 is for inserting a memory disc or card 85, that is used for storing image data picked up through the CCD image sensor. The lid 86 may be opened for loading and unloading a cartridge 88 or a battery pack 89 into and out of a loading chamber 90.

Inside the loading chamber 90 are disposed a thermal head 92 and a platen roller 94. The cartridge 88 contains a roll 95 of recording paper 93 and an ink ribbon 96, such that the recording paper 93 and the ink ribbon 96 are nipped between the thermal head 92 and the platen roller 94 when the cartridge 88 is loaded in the loading chamber 90. As the platen roller 94 rotates, the thermal head 92 heats the ink ribbon 96, so the ink is transferred seriatim to the recording paper 93 as passing through the thermal head 92. A leading portion of the recording paper 93 having an image printed thereon is cut off from the roll 95, and ejected out of the camera 80.

A pair of connectors 98 are also provided in the loading chamber 90. When the battery pack 89 is loaded in the loading chamber 90, a pair of terminal connectors 99 of the battery pack 89 are connected to these connectors 98. Then it comes to be possible to charge a main power source batteries 101 with the battery pack 89, or use the battery pack 89 as a supplementary power source.

Thus, the present invention is not to be limited to the above embodiments but, on the contrary, various modification will be possible to those skilled in the art without departing from the scope of claims appended hereto.

What is claimed is:

1. An electronic still camera comprising a camera section for picking up electronic images of subjects through an image sensor, and memorizing digital image data of the electronic images, and a printer section for recording images on recording materials on the basis of the digital image data, characterized by comprising:

a main power source for supplying the camera section and the printer section;

a loading chamber for holding the recording materials in a position for allowing the printing section to print on the recording materials; and an electrical connection device provided in the loading chamber, for connecting the electronic still camera to an extending device that may be loaded in the loading chamber in place of the recording materials, for extending a particular function of the electronic still camera.

2. An electronic still camera as claimed in claim 1, wherein the extending device includes a supplementary power source.

3. An electronic still camera as claimed in claim 2, wherein the main power source is constituted of at least a rechargeable battery, and the electronic still camera further comprises a charging circuit for charging the main power source with the supplementary power source.

4. An electronic still camera as claimed in claim 2 or 3, wherein the supplementary power source is loaded as a package containing a plurality of rechargeable batteries.

5. An electronic still camera as claimed in claim 1 or 2, wherein the printing section includes a printing head that records an image on a recording surface of the recording material while moving in a plane parallel to the recording surface, and a room for the movement of the printing head is provided in connection to the loading chamber for holding the recording material, wherein the extending device is sized to take up the room for the movement of the printing head as well as the loading chamber.

6. An electronic still camera as claimed in claim 1, wherein the extending device includes an AC/DC adapter.

7. electronic still camera as claimed in claim 1, wherein the recording material is a self-developing type instant photo film unit with a pod of processing fluid, and the printer section comprises an optical printing head for projecting light beams onto the instant photo film unit in accordance with the digital image data, and a developing device including a pair of developing rollers for advancing the instant photo film unit after exposed out of the electronic still camera while rupturing the pod and spreading the processing fluid on the instant photo film unit.

8. An electronic still camera as claimed in claim 1 or 7, wherein the recording materials are loaded as a package or cartridge in the loading chamber, and the package or cartridge may be unloaded from and reloaded in the loading chamber while the recording materials remain unused in the package or cartridge.

9. An electronic still camera as claimed in claim 1, wherein the extending device includes a memory medium.

10. An electronic still camera as claimed in claim 1, wherein the extending device includes a hard disc.

11. An electronic still camera as claimed in claim 1, wherein the printing section is of a thermal printing type.

12. The camera of claim 1, wherein the main power source is disposed in the camera section and operably supplies a voltage potential to both the camera section and the printer section, and wherein the loading chamber alternatively receives the extending device and the recording materials.

13. The camera of claim 1, wherein the main power source is disposed in the camera section and operably supplies a voltage potential to both the camera section and the printer section, wherein the loading chamber receive the extending device and the recording materials in a common physical space.

14. The camera of claim 13, wherein the loading chamber receives the extending device and the recording material alternatively in the common physical space.

15. The camera of claim 1, wherein the camera section and printer are integrally formed and accommodated in a common housing.

16. The camera according to claim 1, wherein the loading chamber accommodates physical dimensions of the recording materials within boundary surfaces of the loading chamber.

* * * * *